US009112729B2

United States Patent
Denis-Courmont et al.

(10) Patent No.: US 9,112,729 B2
(45) Date of Patent: Aug. 18, 2015

(54) TIMER HANDLING (75) Inventors: Remi Denis-Courmont, Espoo (FI); Aki Petteri Niemi, Helsinki (FI)

(73) Assignee: Nokia Corporation, Espoo (FI)

( * ) Notice: Subject to any disclaimer, the term of this patent is extended or adjusted under 35 U.S.C. 154(b) by 1289 days.

(21) Appl. No.: 12/070,114

(22) Filed: Feb. 14, 2008

(65) Prior Publication Data

US 2009/0207738 A1    Aug. 20, 2009

(51) Int. Cl.
- G06F 15/16     (2006.01)
- H04L 12/54     (2013.01)
- H04L 1/18      (2006.01)
- H04L 12/911    (2013.01)

(52) U.S. Cl.
CPC .......... *H04L 12/5695* (2013.01); *H04L 1/1848* (2013.01); *H04L 47/826* (2013.01)

(58) Field of Classification Search
USPC ....................................................... 370/238
See application file for complete search history.

(56) References Cited

U.S. PATENT DOCUMENTS

| | | | |
|---|---|---|---|
| 6,909,724 B1 * | 6/2005 | Albert et al. | 370/465 |
| 7,324,459 B2 | 1/2008 | Rasanen et al. | 370/252 |
| 7,397,789 B2 * | 7/2008 | Chari et al. | 370/351 |
| 7,535,845 B2 * | 5/2009 | Bou-Diab et al. | 370/238 |
| 2006/0165049 A1 * | 7/2006 | Bou-Diab et al. | 370/351 |
| 2007/0258428 A1 * | 11/2007 | Zuniga et al. | 370/338 |
| 2007/0283002 A1 * | 12/2007 | Bornhoevd et al. | 709/224 |
| 2007/0294426 A1 * | 12/2007 | Huang et al. | 709/234 |
| 2009/0207738 A1 * | 8/2009 | Denis-Courmont et al. | 370/238 |

OTHER PUBLICATIONS

Network Working Group, Internet Engineering Task Force, "Requirements for Internet Hosts—Communication Layers", Oct. 1989, 96 pgs.
Network Working Group, Teredo: Tunneling IPv6 over UDP through Network Address Translations (NATs), Feb. 2006, 41 pgs.
Internet-Draft, "Discovering, Querying, and Controlling Firewalls and NATs draft-wing-behave-nat-control-stun-usage-05", Oct. 16, 2007, 25 pgs.
Cisco Systems, Inc., "Mobile IP Support for RFC 3519 NAT Traversal", © 2004, 16 pgs.
Cisco Systems, Inc., "Enabling Easy Roaming Across Different Radio Access Technologies", © 1992-2005, 11 pgs.

* cited by examiner

*Primary Examiner* — Brian P Whipple
*Assistant Examiner* — Keyvan Emdadi
(74) *Attorney, Agent, or Firm* — Harrington & Smith (57) ABSTRACT

Methods, apparatuses, computer program products and a system for enabling timer value handling are provided. Handling of timer values is enabled by creating a connection initiation message, placing into the connection initiation message a state keeping timer value, and sending the connection initiation message. Timer value handling is further enabled by receiving a connection initiation message, determining availability of state keeping timer adjustment on the basis of the connection initiation message, acquiring, in case state keeping timer adjustment is available, a state keeping timer value from the connection initiation message, creating a connection initiation response message, placing the state keeping timer value into the connection initiation response message, and sending the connection initiation response message.

15 Claims, 7 Drawing Sheets

TIMER HANDLING

FIELD OF THE INVENTION

The present invention relates in general to timer handling, and in particular, though not exclusively, to handling timer values in network nodes of a network.

BACKGROUND OF THE INVENTION

Packet-switched communication has become commonplace in today's communication systems and applications. Presently, packet-switched communication is available in wireline and wireless networks for data and voice communication applications. Features of packet-switched communication may include the reservation of transmission capacity only for the duration of an actual data (e.g. application or voice data) transmission, thus enabling the sharing of common transmission capacity between a plurality of data transmission flows.

A prevailing protocol family used in packet-switched communication is the TCP/IP (Transmission Control Protocol/Internet Protocol) protocol family, where the TCP and IP protocols represent the core protocols of the protocol family. The TCP protocol is a connection-oriented protocol that may operate on a transport layer and provides reliable delivery, including flow and congestion control, of data packets between communication endpoints. The IP protocol is a connectionless protocol that may operate on a network layer and provides e.g. addressing and routing of data packets between endpoints. In some applications, some other transport protocol, such as for example SCTP (Stream Control Transmission Protocol) or UDP (User Datagram Protocol) is used on top of the IP protocol in stead of the TCP protocol.

IP networks may comprise communication endpoint nodes, such as client and server computers, that are connected to the IP network either directly or through a wireline or wireless access network, and intermediate nodes, or routers, that handle data traffic routing between the communication endpoints. Along with the expansion of the use of IP networks, as well as the increase of data traffic carried therein, a need for further development of the IP networks in particular and packet-switched networks in general, and for introduction of new features has emerged.

For example, modern IP networks may comprise intermediate network entities called middle-boxes for providing policy enforcement in IP networks. Such middle-boxes include e.g. firewalls, network address translators (NAT), network address/port translators (NAPT), and QoS (Quality of Service) policing devices. A firewall may be a network entity that controls traffic flow between computer networks, such as IP networks. NAT/NAPT is a network entity that e.g. separates a private computer network from a public network and provides a network address translation/mapping between private and public network addresses. A QoS policing device is a network entity that enforces QoS policies on data flows e.g. by providing access to transmission capacity according to priorities assigned to different data flows.

Middle-boxes typically maintain a particular state associated with data flows. For example, a NAT may maintain a mapping between a private network address and a public network address. Typically, in case a data flow becomes inactive, i.e. data packets belonging to said data flow cease to be transmitted, a middle-box maintains a state, such as a mapping between a private and a public network address, associated with an inactive data flow for a predetermined time period, after which state information is removed.

In case a middle-box clears a state associated with an inactive data flow (i.e. removes state information associated with the data flow) and transmission of data packets belonging to said previously inactive data flow is resumed, the resumed data transmission is most likely disrupted due to an error caused by the middle-box not being able to deliver data packets to the right destination. For example, if a NAT removes a mapping between a private and a public network address from its mapping table, the NAT will no longer be able to deliver data packets sent to the public network address of a device, as the device's private network address is no longer associated with the device's public network address. In order to avoid the expiry of a state associated with a data flow at a middle-box, a communication endpoint can occasionally send a dummy data packet belonging to the data flow to keep the data flow active. Typically, a communication endpoint is not aware of the length of the period of time for which a middle-box maintains a state for an inactive data flow, and therefore the endpoint may have to send the dummy keep-alive packets more often than necessary.

SUMMARY

The present invention aims at addressing at least some of the issues discussed above. According to a first aspect of the invention there is provided a method, which comprises creating a connection initiation message, placing into the connection initiation message a state keeping timer value, and sending the connection initiation message.

According to a second aspect of the invention there is provided an apparatus comprising a communication interface configured to operate a communication connection, and a processor functionally coupled to the communication interface, the processor having been configured to create a connection initiation message, to place into the connection initiation message a state keeping timer value, and to send the connection initiation message through the communication interface.

According to a third aspect of the invention there is provided a computer program product embodied on a computer-readable medium, the computer program comprising program code operable to be loaded into the memory of and executed on a computing apparatus, the program code having been configured to enable, when executed, the computing apparatus to create a connection initiation message, to place into the connection initiation message a state keeping timer value, and to send the connection initiation message.

According to a fourth aspect of the invention there is provided an apparatus comprising communication interface means for operating a communication connection, means for creating a connection initiation message, means for placing into the connection initiation message a state keeping timer value, and means for sending the connection initiation message through the communication interface means.

According to a fifth aspect of the invention there is provided a method, which comprises receiving a connection initiation message, determining availability of state keeping timer adjustment on the basis of the connection initiation message, acquiring, in case state keeping timer adjustment is available, a state keeping timer value from the connection initiation message, creating a connection initiation response message, placing the state keeping timer value into the connection initiation response message, and sending the connection initiation response message.

According to a sixth aspect of the invention there is provided an apparatus comprising a communication interface configured to operate a communication connection, and a processor functionally coupled to the communication interface, wherein the processor is configured to receive a connection initiation message through the communication interface, to determine availability of state keeping timer adjustment on the basis of the connection initiation message, to acquire a state keeping timer value from the connection initiation message, to create a connection initiation response message, to place the state keeping timer value into the connection initiation response message, and to send the connection initiation response message through the communication interface.

According to a seventh aspect of the invention there is provided a computer program product embodied on a computer-readable medium, the computer program comprising program code operable to be loaded into the memory of and executed on a computing apparatus, the program code having been configured to enable, when executed, the computing apparatus to receive a connection initiation message, to determine availability of state keeping timer adjustment on the basis of the connection initiation message, to acquire, in case state keeping timer adjustment is available, a state keeping timer value from the connection initiation message, to create a connection initiation response message, to place the state keeping timer value into the connection initiation response message, and to send the connection initiation response message.

According to an eighth aspect of the invention there is provided an apparatus comprising communication interface means for operating a communication connection, means for receiving a connection initiation message through the communication interface means, means for determining availability of state keeping timer adjustment on the basis of the connection initiation message, means for acquiring a state keeping timer value from the connection initiation message, means for creating a connection initiation response message, means for placing the state keeping timer value into the connection initiation response message, and means for sending the connection initiation response message through the communication interface.

According to a ninth aspect of the invention there is provided a method, which comprises receiving a message associated with a connection initiation, wherein the message includes a state keeping timer value, determining whether the state keeping timer value meets a predetermined criterion, modifying the state keeping timer value in case the timer value does not meet the predetermined criterion, and sending the message.

According to a tenth aspect of the invention there is provided an apparatus comprising a communication interface configured to operate a communication connection, and a processor functionally coupled to the communication interface, wherein the processor is configured to receive a message associated with a connection initiation through the communication interface, the message having been sent from a first communication endpoint to a second communication endpoint, wherein the message includes a state keeping timer value, to determine whether the state keeping timer value meets a predetermined criterion, to modify the state keeping timer value included in the message, and to forward the message to the second communication endpoint through the communication interface.

According to an eleventh aspect of the invention there is provided a computer program product embodied on a computer-readable medium, the computer program comprising program code operable to be loaded into the memory of and executed on a computing apparatus, the program code having been configured to enable, when executed, the computing apparatus to receive a message associated with a connection initiation, wherein the message includes a state keeping timer value, to determine whether the state keeping timer value meets a predetermined criterion, to modify the state keeping timer value in case the timer value does not meet the predetermined criterion, and to send the message.

According to a twelfth aspect of the invention there is provided an apparatus comprising communication interface means for operating a communication connection, means for receiving a message associated with a connection initiation through the communication interface, wherein the message includes a state keeping timer value, means for determining whether the state keeping timer value meets a predetermined criterion, means for modifying the state keeping timer value, and means for sending the message through the communication interface.

According to a thirteenth aspect of the invention there is provided a system comprising a communication endpoint node configured to send a message associated with a connection initiation, wherein the message comprises a state keeping timer value, and an intermediate node configured to receive the message, to modify the state keeping timer value of the message, and to set a state keeping timer according to the state keeping timer value of the message.

The method, the apparatus; the computer program product, and the system of the present invention enable the sharing of information about a desired or required timer value across multiple nodes in a network. In this way, network nodes may set a suitable timer value associated with e.g. maintaining a particular state. Once the timer is set, a communication endpoint node is able to determine an interval in which appropriate actions are to be taken in order to prevent the state from expiring. This facilitates an efficient use of the node's and the network's resources.

Various exemplary embodiments of the present invention are illustrated hereinafter in the detailed description of the invention as well as in the dependent claims appended hereto. The embodiments are illustrated with reference to selected aspects of the invention. A person skilled in the art appreciates that any embodiment of the invention may apply to other aspects as well either alone or in combination with other embodiments.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
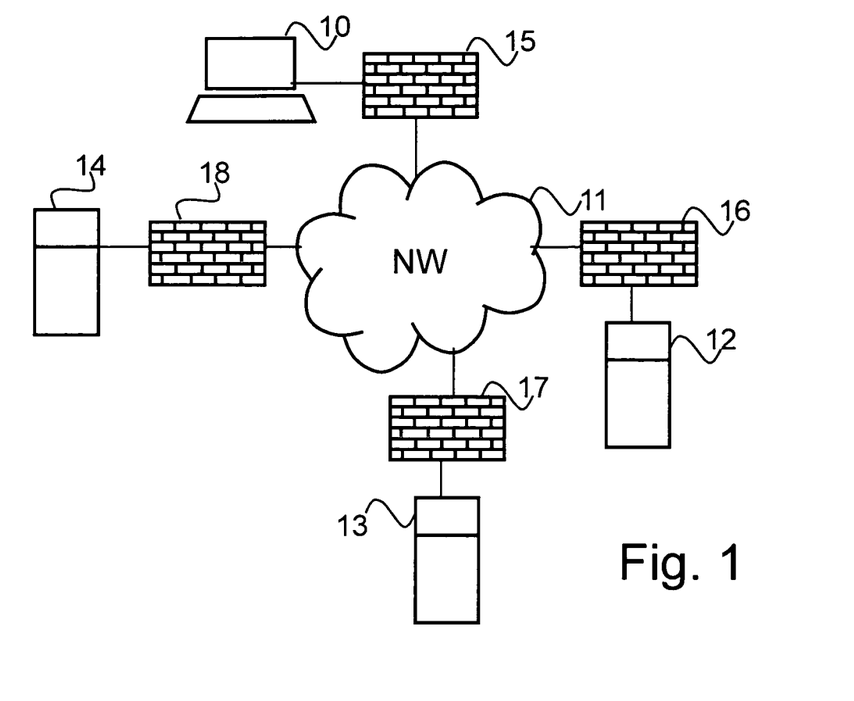
FIG. 1 depicts an example of a system where embodiments of the invention may be utilized.

Reference is made to FIG. 1, which depicts an example of a system in which some embodiments of the invention may be used. The system of FIG. 1 comprises a user device 10 representing a communication endpoint node, servers 12, 13, 14 representing another communication endpoint nodes, and middle-boxes 15, 16, 17, 18. The user device 10 and the servers 12, 13, 14 communicate through network 11. The user device 10 and the servers 12, 13, 14 are connected to the network 11 through the middle-boxes 15, 16, 17, 18, respectively.

The user device 10 may be for example a laptop or handheld computer, a mobile phone, a PDA (Personal Digital Assistant), or a game console. The user device 10 may be connected to the network 11 and the middle-box 15 through a wireline or a wireless connection, or a combination thereof. For example, the user device 10 may be connected to the network 11 and the middle-box 15 through a short-range radio connection, such as Bluetooth® or WLAN (Wireless Local Area Network) connection, or through a mobile communication network, such as a GSM or a UMTS network.

The network 11 may be an IP based network, such as the internet. The servers 12, 13, 14 may be application servers, such as web servers, e-mail servers, instant messaging servers, voice messaging servers, or telephony servers.

The middle-boxes 15, 16, 17, 18 may be for example network address translators (NAT), network address/port translators (NAPT), firewalls, or QoS (Quality of Service) policing devices.

In a similar manner as the user device 10, the servers 12, 13, 14 may be connected to the network 11 and the middle-boxes 15, 16, 17, 18 through a wireline or a wireless connection, or a combination thereof.

Figure 2:
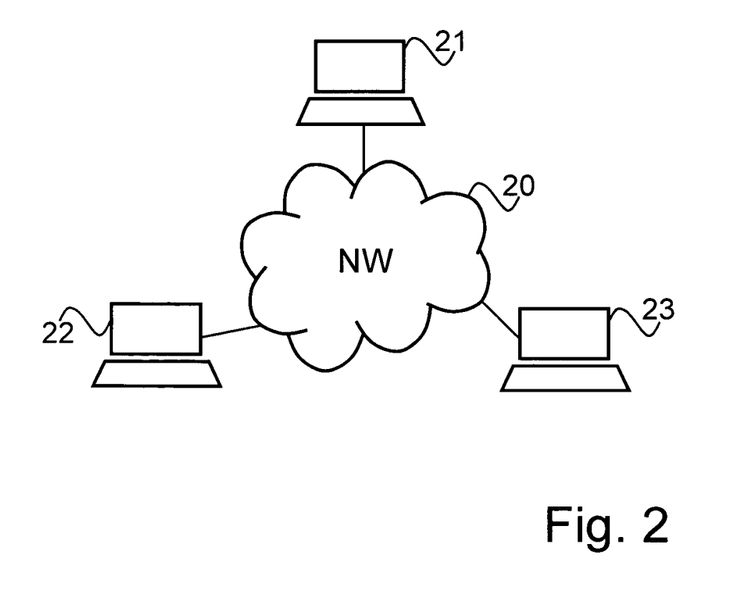
FIG. 2 shows another example of a system where embodiments of the invention may be used.

Reference is now made to FIG. 2, which illustrates another example of a system where some embodiments of the invention may be used. The system of FIG. 2 represents a mobile mesh or a pervasive computing network, such as a smart space, which comprises devices 21, 22, 23. The devices 21, 22, 23 may be similar as the device 10 of Figure described hereinbefore, or the devices 21, 22, 23 may be other devices that are connected to the mobile mesh or pervasive computing network. The devices 21, 22, 23 are inter-connected through the network 20, which may comprise a short-range radio network such as a Bluetooth® network.

In the system of FIG. 2, each device 21, 22, 23 may represent a communication endpoint, i.e. each device may request establishment of a connection to another device. In a similar manner, each device may also represent a middle-box, possibly imposing policy restrictions on the communication and data flows between the other two devices.

A skilled person appreciates that FIGS. 1 and 2 only outline some examples of systems where the invention may be used and that the invention may be implemented in real-life systems that comprise a number of similar or other network elements and entities as required by a specific implementation.

Figure 3:
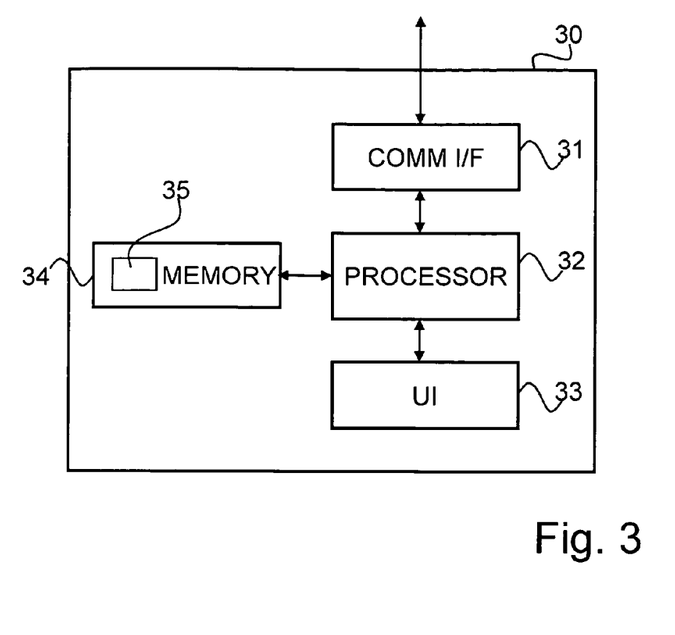
FIG. 3 outlines an example of the structure of a device in which embodiments of the invention may be implemented.

Reference is now made to FIG. 3, which outlines the structure of an apparatus 30, in which embodiments of the invention may be implemented. A skilled person appreciates that the general structure outlined in FIG. 3 applies to the user device 10, servers 12, 13, 14, and middle-boxes 15, 16, 17, 18 of FIG. 1, as well as to the devices 21, 22, 23 of FIG. 2.

The general structure of the apparatus 30 of FIG. 3 comprises a communication interface module 31, a processor 32 coupled to the communication interface module 31, and a memory 34 coupled to the processor 32. The apparatus further comprises a computer program 35 stored in the memory 34 and operable to be loaded into and executed in the processor 32, which enables the apparatus 30 to operate according to the embodiments of the invention.

In case the apparatus 30 represents a user device, such as that denoted with reference numeral 10 in FIG. 1 and described hereinbefore, the apparatus 30 may further comprise a user interface controller 33 coupled to the processor 32.

The communication interface module 31 may be e.g. a radio interface module, such as a WLAN, Bluetooth, GSM/GPRS, CDMA, or WCDMA radio module, or a wireline interface module, such as a LAN interface module. The communication interface module 31 may be integrated into the apparatus 30 or into an adapter, card or the like that may be inserted into a suitable slot or port of the apparatus 30. The communication interface module 31 may support one radio or wired interface technology or a plurality of technologies. FIG. 3 shows one communication interface module 31, but the apparatus 30 may comprise a plurality of communication interface modules 31.

The processor 32 may be e.g. a central processing unit (CPU), a microprocessor, a digital signal processor (DSP), a graphics processing unit, or the like. FIG. 3 shows one processor 32, but the apparatus 30 may comprise a plurality of processors. The apparatus 30 may e.g. comprise a baseband processor and a multimedia processor.

The memory 34 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a memory or smart card, such as a SIM or USIM card, or the like. The apparatus 30 may comprise a plurality of memories 34. The memory 34 may be constructed as a part of the apparatus 30 or it may be inserted into a slot, port, or the like of the apparatus 30 by a user. The memory 34 may serve the sole purpose of storing data, or it may be constructed as a part of an apparatus serving other purposes, such as processing data.

If the apparatus 30 includes a user interface controller 33, the user interface controller 33 may comprise circuitry for receiving input from a user of the apparatus 30 e.g. via a keyboard, graphical user interface shown on the display of the apparatus 30, speech recognition circuitry, or an accessory device, such as a headset, and for providing output to the user via e.g. a graphical user interface or a loudspeaker.

A skilled person appreciates that in addition to the elements shown in FIG. 3, the apparatus 30 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like.

Figure 4:
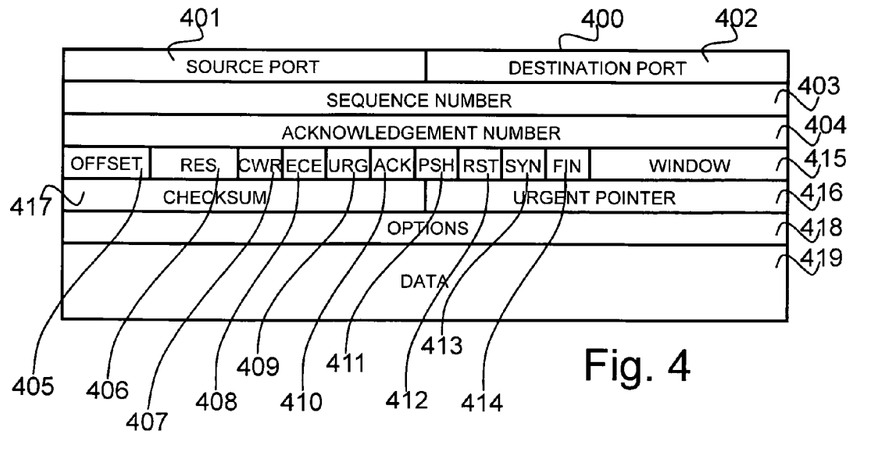
FIG. 4 depicts the structure of a TCP segment, which may be used for implementing an embodiment of the invention.

Reference is now made to FIG. 4, which shows the structure of a TCP segment, which may be used in implementing some embodiments of the present invention. The TCP segment (or TCP packet) 400 comprises a header portion (fields 401 to 418) and a data portion 419. The header portion comprises a field 401 for source port, a field 402 for destination port, a sequence number field 403, an acknowledge number field 404, a data offset field 405, a field reserved for future use 406, fields 407 to 414 for particular flag bits, a window size field 415, a checksum field 417, an urgent pointer field 416, and an options field 418. The role and use of the header fields are described in detail e.g. in RFC (Request For Comments) 793 by the IETF (Internet Engineering Task Force).

Figure 5:
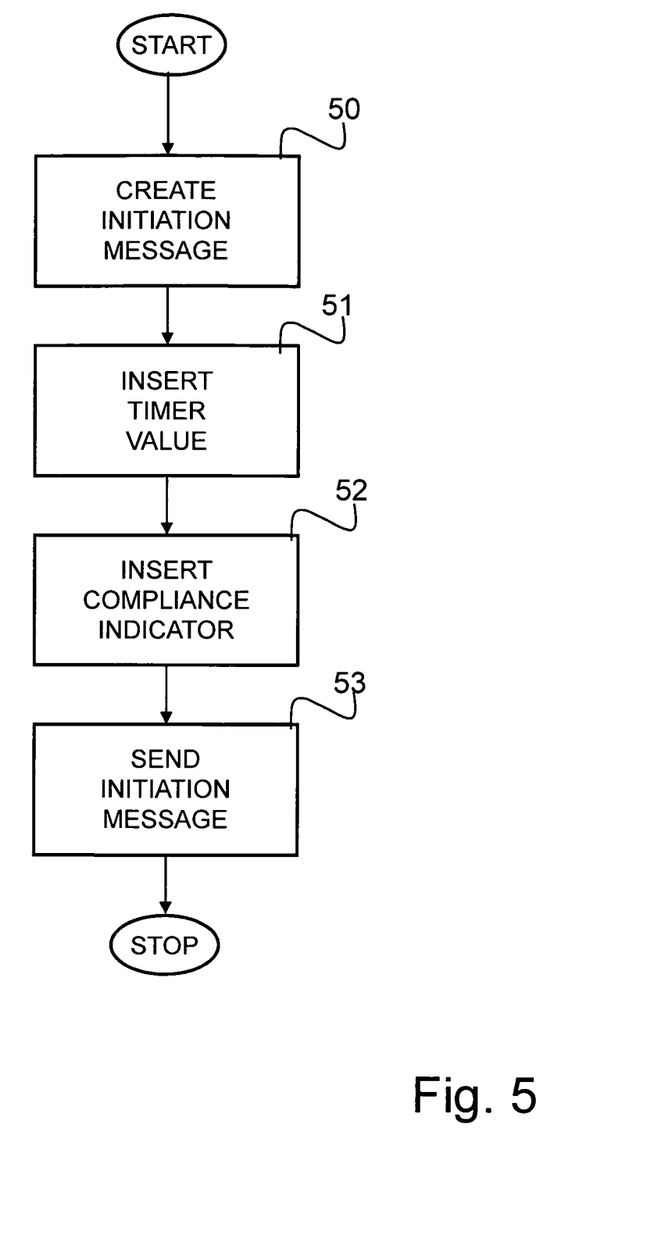
FIG. 5 illustrates an example of a method according to an embodiment of the invention.

Reference is now made to FIG. 5, which illustrates a method according to an embodiment of the invention. In step 50, a connection initiation message is created. The connection initiation message may be for example a TCP SYN message, which comprises at least a portion of the header fields described hereinbefore with reference to FIG. 4. For example, in a TCP SYN message, the SYN bit 413 of FIG. 4 is set to one.

The connection initiation message may be created by the processor 32 of the apparatus 30 depicted in FIG. 3. The processor 32 may be controlled by the programming instructions of the computer program 35, when the computer program 35 is executed in the processor 32.

The apparatus creating the connection initiation message may be for example the user device 10 or any of the servers 12, 13, 14 of the system of FIG. 1, or any of the devices 21, 22, 23 of the system of FIG. 2, which system may represent e.g. a mobile mesh network or a smart space.

A timer value may be inserted into the connection initiation message in step 51 of FIG. 5. The timer value may be for example a state keeping timer value, which may indicate a desired time period, for which a particular state is kept active at a middle-box. The desired timer value may be determined by a communication party creating the connection initiation message. In an embodiment of the invention, where the connection initiation message is a TCP SYN message, the timer value may be inserted into the TCP options field 418 of the TCP segment header shown in FIG. 4. If the timer value is placed into the TCP options field 418, the timer value is accompanied by a suitable TCP option identifier.

The timer value may be inserted into the connection initiation message during the processing of the message in the processor 32 of the apparatus 30 shown in FIG. 3.

In an embodiment of the invention, a compliance indicator may be inserted into the connection initiation message in step 52 of FIG. 5. The compliance indicator may be for example the network address, such as the IP address, of the apparatus that creates the connection initiation message. The compliance indicator may further comprise a port number, such as a TCP port number, associated with the data flow that is transmitted through the connection that is established by means of the connection initiation message.

In an embodiment of the invention, where the connection initiation message is a TCP SYN message, the compliance indicator may be inserted as a TCP option into the options field 418 shown in FIG. 4. In that case the compliance indicator is accompanied by a suitable option identifier in a similar manner as described hereinbefore in connection with the timer value.

In a similar manner, insertion of the compliance indicator into the connection initiation message may be part of the processing of the connection initiation message in the processor 32 of the apparatus 30 shown in FIG. 3, wherein the apparatus 30 may represent e.g. the user device 10 or the servers 12, 13, 14 of FIG. 1, or the devices 21, 22, 23 shown in FIG. 2.

In step 53 of FIG. 5, the connection initiation message is sent to a communication endpoint with which a connection is established e.g. through the communication interface 31 of apparatus 30 in FIG. 3.

A skilled person appreciates that the steps illustrated in FIG. 5 need not be carried out in the order shown in the Figure. For example, if a compliance indicator is to be inserted into the connection initiation message, it may be inserted prior to or in parallel with inserting the timer value into the connection initiation message.

Figure 6A:
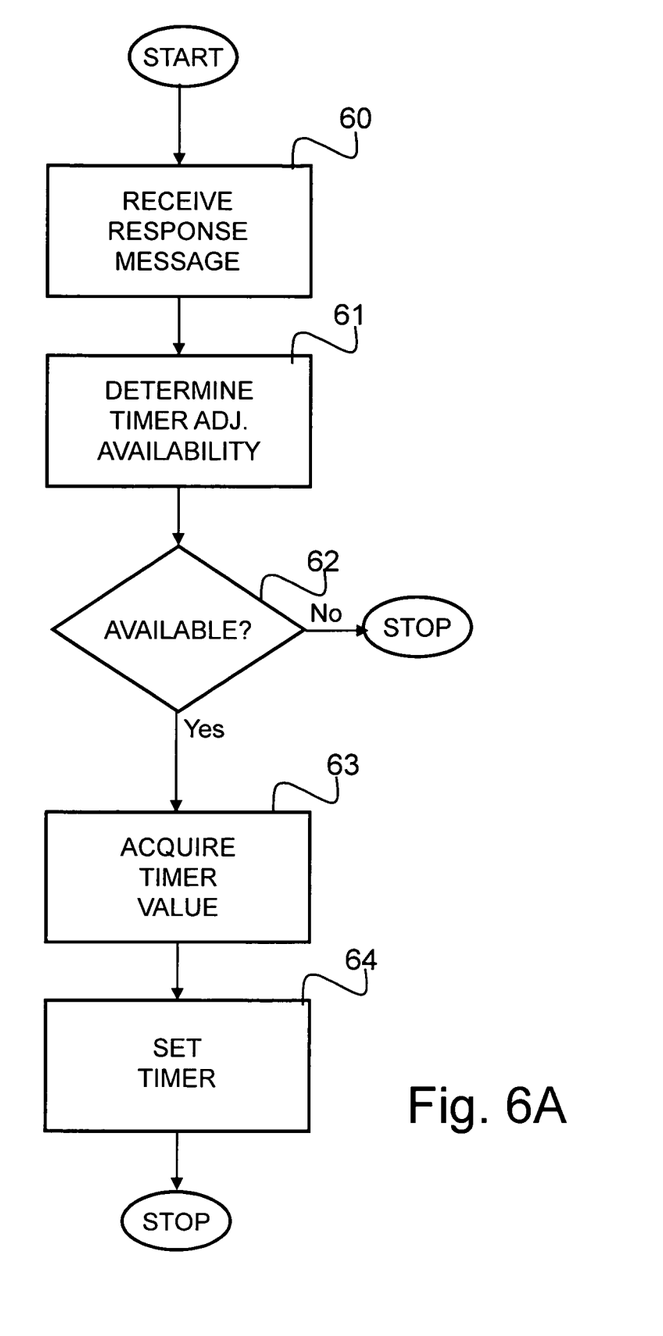
FIG. 6A illustrates another example of a method according to an embodiment of the invention.

Reference is now made to FIG. 6A, which shows a method according to an embodiment of the invention. A connection initiation response message is received in step 60, following an earlier sending of a connection initiation message. In case the connection initiation message is a TCP SYN message, the connection initiation response message is a TCP SYN/ACK message, where e.g. the ACK and SYN bits (fields 410 and 413 of FIG. 4, respectively) are set to one.

The connection initiation response message may be received for processing by the processor 32 through the communication interface 31 of the apparatus 30 shown in FIG. 3, wherein the apparatus may represent e.g. the user device 10 or the servers 12, 13, 14 of FIG. 1, or the devices 21, 22, 23 shown in FIG. 2.

In steps 61 and 62, availability of timer adjustment may be determined on the basis of the connection initiation response message received in step 61. Said determination is described further hereinafter with reference to FIG. 6B.

If timer adjustment is determined, in steps 61 and 62, to be available, a timer value is acquired from the connection initiation response message in step 63. The timer value acquired from the message may be a state keeping timer value, which may indicate a desired time period, for which a particular state is kept active at a middle-box. If it is determined in step 62 that timer adjustment is not available, processing of the connection initiation response message according to the method shown in FIG. 6A is stopped.

In step 64, a timer is set according to the timer value acquired from the connection initiation response message. For example, if the timer value represents a state keeping timer value, the timer set in step 64 may determine a time period, for which a data flow may be inactive, i.e. no data packets belonging to the data flow are transmitted between the communication endpoints, before a state associated with the data flow is removed. In an embodiment of the invention, a data packet belonging to an inactive data flow may be transmitted between the communication endpoints when the time period determined by the timer set in step 64 expires in order to maintain states that have been associated with the data flow at middle-boxes located on the communication path.

The steps of the method depicted in FIG. 6A may be performed e.g. by the apparatus 30 shown in FIG. 30. For example, the connection initiation response message is received for processing by the processor 32 through the communication interface 31, the processor processes the message in steps 61 to 64, possibly using the memory 34 for storing at least a portion of the message and processing results, and stores the timer in the memory 34. The processor 32 may be controlled by the computer program 35. The apparatus 30 may represent e.g. the user device 10 or the servers 12, 13, 14 of FIG. 1, or the devices 21, 22, 23 shown in FIG. 2.

Figure 6B:
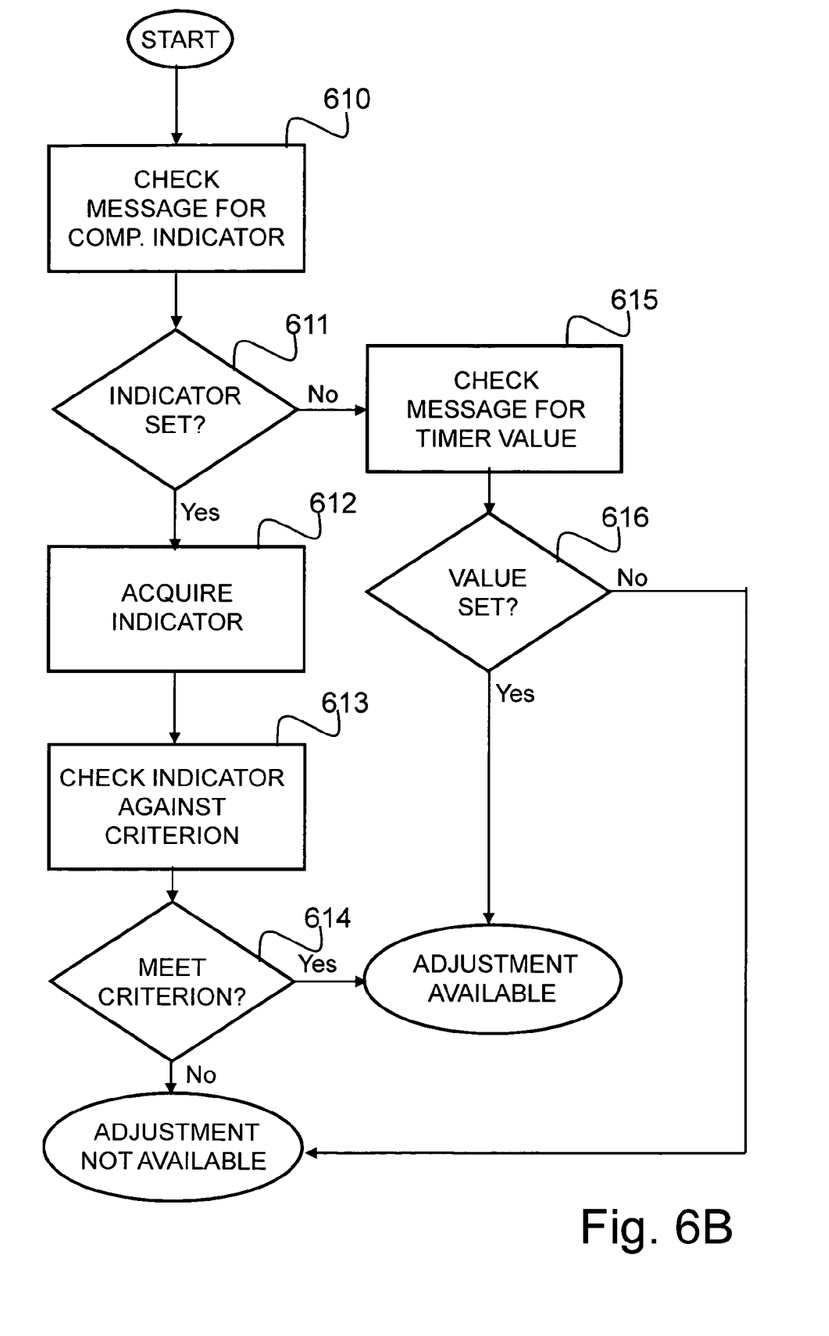
FIG. 6B shows an example of a method according to which a particular phase of the method of FIG. 6A may be effected.

Reference is now made to FIG. 6B, which depicts an example of a method for determining the availability of timer adjustment according to an embodiment of the invention. In step 610, a connection initiation response message received in step 60 of FIG. 6A is examined in order to determine, whether the connection initiation response message includes a compliance indicator. The compliance indicator may represent the network address of the sender of the connection initiation response message, and may further comprise a port number as described hereinbefore. In case the connection initiation response message is a TCP SYN/ACK message, the compliance indicator may be carried in the TCP options field (field 418 in FIG. 4) in a manner described hereinbefore.

In step 611, it is determined whether a compliance indicator is included in the connection initiation response message.

If a compliance indicator is included, the method proceeds to step 612. In case a compliance indicator is not included, the method may continue in step 615.

In step 612, the compliance indicator is acquired from the connection initiation response message. In step 613, the compliance indicator is checked against a predetermined criterion. The compliance indicator may also need to meet a plurality of criteria. For example, if the compliance indicator represents the network address of the sender of the connection initiation response message, the compliance indicator may be compared to the source network address included in the data unit carrying the connection initiation response message or portions thereof. In case the connection initiation response message is a TCP SYN/ACK message/segment, it may be carried in an IP datagram, which includes a source IP address.

In the example above, the compliance indicator included in the connection initiation response message, representing the network address of the sender of the message, is compared with the source address included in and acquired from the data unit carrying the message. For example, if the compliance indicator represents the IP address of the sender, the indicator value (an IP address) is compared with the source address of the IP datagram carrying the indicator. If the compliance indicator matches the source address of the data unit in step 614, it is determined that timer adjustment is available, and the method illustrated in FIG. 6A continues in step 63. If the compliance indicator does not match the source address of the data unit in step 614, it is determined that timer adjustment is not available, and processing according to the method illustrated in FIG. 6A ends in step 62. A similar comparison is made with respect to port numbers in case the compliance indicator further comprises a sender port number and the connection initiation response message is a TCP SYN/ACK segment. In such a case a source port number is acquired for comparison from the source port field (field 401 of FIG. 4) of the TCP SYN/ACK segment.

A match between a compliance indicator value and the source address of a data unit is described further hereinafter with reference to FIG. 8.

If, in step 611, it is determined that a connection initiation response message does not include a compliance indicator, processing according to the method of FIG. 6B may continue in step 615, where the connection initiation response message is examined for determining, whether the message includes a timer value, such as a state keeping timer value described hereinbefore. If the connection initiation message includes a timer value, it may be determined in step 616 that timer adjustment is available, and the method of FIG. 6A continues in step 63. If the connection initiation message does not include a timer value, it is determined in step 616 that timer adjustment is not available, and processing according to the method illustrated in FIG. 6A ends in step 62.

A skilled person appreciates that the steps of the method illustrated in FIG. 6B need not be executed in the order shown, and that all steps shown in FIG. 6B are not necessary in some embodiments of the invention. For example, determination of availability of timer adjustment may be based solely on the presence of a timer value in a connection initiation or a connection initiation response message. In this case the steps 610 to 614 of FIG. 6B may be left out and the processing according to the method starts in step 615.

The steps of the method depicted in FIG. 6B may be performed e.g. by the apparatus 30 shown in FIG. 30. For example, the connection initiation response message is processed in steps 610 to 616 by the processor 32, possibly using the memory 34 for storing at least a portion of the message and processing results. The processor 32 may be controlled by the computer program 35. The apparatus 30 may represent e.g. the user device 10 or the servers 12, 13, 14 of FIG. 1, or the devices 21, 22, 23 shown in FIG. 2.

Figure 7:
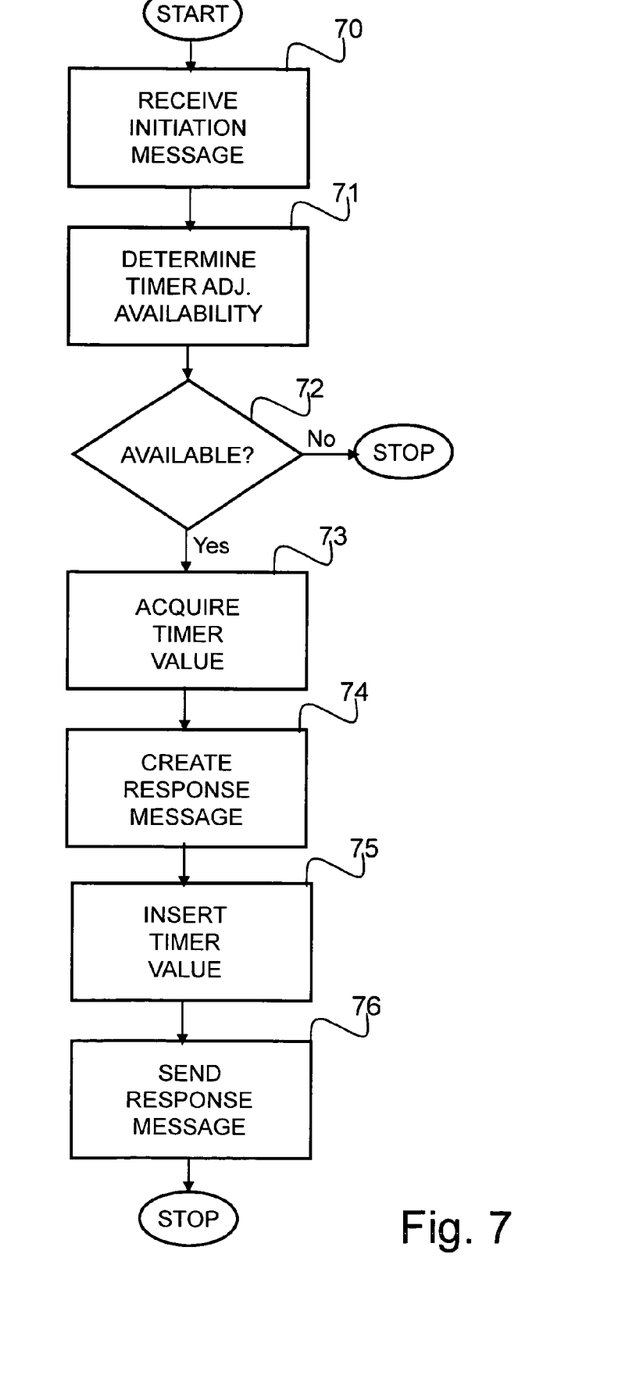
FIG. 7 illustrates an example of a method according to an embodiment of the invention.

Reference is now made to FIG. 7, which depicts a method according to an embodiment of the invention. In step 70, a connection initiation message is received. The connection initiation message may be a TCP SYN segment as described hereinbefore. In step 71, availability of timer adjustment is determined on the basis of the connection initiation message. Availability of timer adjustment may be determined in a similar manner as described hereinbefore with reference to FIG. 6B.

In case timer adjustment is determined, in step 72, to be available, processing according to the method of FIG. 7 continues in step 73. Otherwise, processing according to the method ends after step 72.

A timer value, such as a state keeping timer value, is acquired from the connection initiation message in step 73. In case the connection initiation message is a TCP SYN segment, the timer value may be carried in the options field 418 of the TCP SYN segment 400 shown in FIG. 4 in a manner described hereinbefore. In step 74, a connection initiation response message is created. In case the connection initiation message is a TCP SYN segment, the connection initiation response message is a TCP SYN/ACK segment.

In step 75, the timer value acquired from the connection initiation message in step 73 is inserted into the connection initiation response message. In an embodiment where the connection initiation response message is a TCP SYN/ACK segment, the timer value may be placed into the options field of the TCP SYN/ACK segment, accompanied by a suitable option identifier, in a manner described hereinbefore. The connection initiation response message is sent to the originator of the connection initiation message in step 76.

A compliance indicator may also be inserted into the connection initiation response message prior to sending the message. The compliance indicator may e.g. represent the network address of the sender of the connection initiation response message. In such a case, the network address, such as the IP address, of the sender is inserted into the connection initiation response message. In case of the connection initiation response message being a TCP SYN/ACK segment, the compliance indicator may be placed into the options field of the TCP SYN/ACK message in a manner described hereinbefore. A timer may be set according to the timer value acquired from the connection initiation message in step 73.

A skilled person appreciates that the method steps shown in FIG. 7 need not be carried out in the order shown in the Figure. For example, a connection initiation response message may be created as the next step after receiving the connection initiation message in step 70.

The steps of the method depicted in FIG. 7 may be performed e.g. by the apparatus 30 shown in FIG. 30. For example, the connection initiation message and the connection initiation response message is processed in steps 70 to 76 by the processor 32, possibly using the memory 34 for storing at least portions of the messages and processing results. The processor 32 may be controlled by the computer program 35. The apparatus 30 may represent e.g. the user device 10 or the servers 12, 13, 14 of FIG. 1, or the devices 21, 22, 23 shown in FIG. 2.

Figure 8:
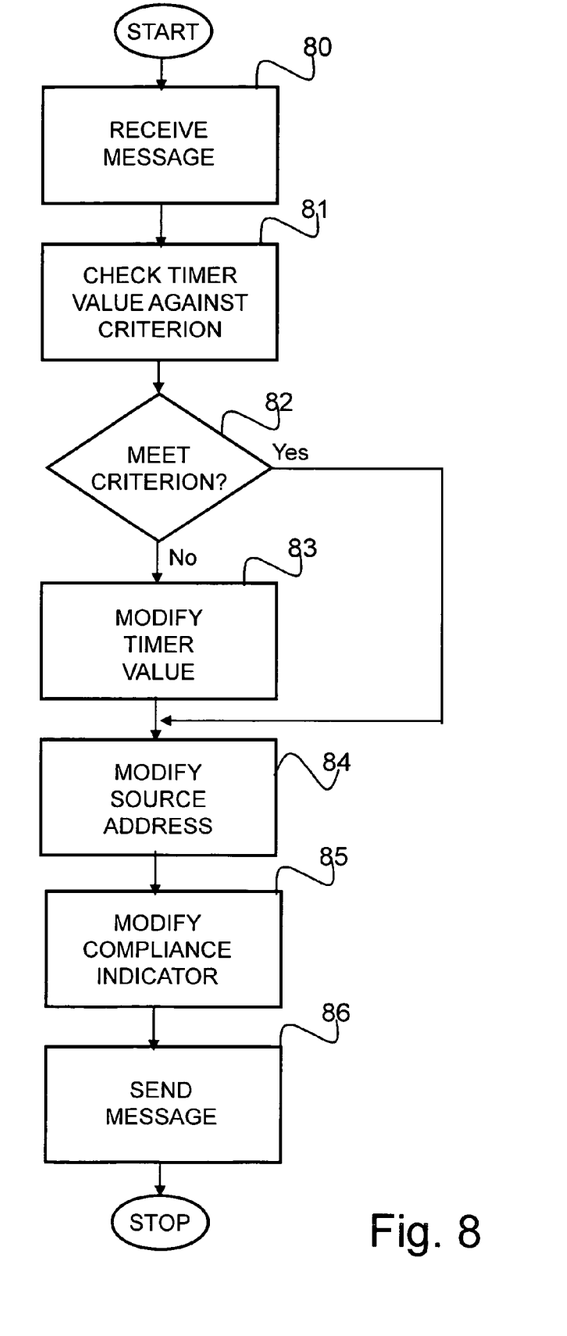
FIG. 8 depicts a further example of a method according to an embodiment of the invention.

Reference is now made to FIG. 8, which illustrates a method according to an embodiment of the invention. In step 80, a message associated with a connection initiation is received e.g. at a middle-box. The message may be a connection initiation message or a connection initiation response message sent by a communication endpoint to another communication endpoint during connection establishment. When the middle-box is located on the data path between the communication endpoints, the connection initiation message or the connection initiation response message, or both, passes through the middle-box. Examples of such messages include TCP SYN and TCP SYN/ACK messages. The received message may include a timer value, such as a state keeping timer value described hereinbefore. In case the message is a TCP SYN or a TCP SYN/ACK message, the timer value may be located in the options field of the TCP message/segment header, as described hereinbefore.

If the message received in step 80 includes a timer value, the timer value is acquired from the message, and in step 81 it is determined, whether the timer value meets a predetermined criterion. The criterion may be for example a maximum timer value determined by a local policy. If the timer value meets the predetermined criterion, processing according to an embodiment of the invention may continue in step 84. If the timer value does not meet the predetermined criterion, the timer value included in the message may be modified in step 83 such that the modified timer value meets the predetermined criterion.

In some embodiments of the invention the source address of the data unit, in which the connection initiation message or the connection initiation response message is carried, is modified in step 84. This may be the case when the middle-box is a network address translator NAT. The middle-box may modify the source address of the protocol unit e.g. by substituting the source address for another address. For example, a private network address may be substituted for a public network address.

If the message received in step 80 further includes a compliance indicator, the compliance indicator may be modified in step 85. In those embodiments of the invention, in which the middle-box is capable of network address translation, the compliance indicator may represent the network address of the sender of a connection message (either a connection initiation message or a connection initiation response message). The sender of the connection message may have inserted its network address as a compliance indicator into the connection message in a manner described hereinbefore. If the middle-box modifies the source address of the data unit, in which the connection message with a compliance indicator (in this example the sender's network address) is carried, the middle-box may also modify the sender's network address included in the compliance indicator of the connection message such that the modified network address in the compliance indicator matches the modified source address of the data unit carrying the connection message.

In step 86, the connection message is forwarded to the intended recipient of the connection message. That is, the connection message received from a communication endpoint is forwarded to another communication endpoint which is the intended recipient of the connection message. At this point, the connection message may include a modified or unmodified timer value, as well as a modified or unmodified compliance indicator as described hereinbefore. A middle-box may modify the compliance indicator e.g. if the compliance indicator represents a sender's network address and if the middle-box modifies the source network address of the data unit carrying a connection message comprising the compliance indicator.

A skilled person appreciates that the method steps shown in FIG. 8 need not be carried out in the order shown in the Figure. For example, a source address may be modified as the next step after receiving the connection message in step 80.

The steps of the method depicted in FIG. 8 may be performed e.g. by the apparatus 30 shown in FIG. 30. For example, a connection initiation message and a connection initiation response message is processed in steps 80 to 86 by the processor 32, possibly using the memory 34 for storing at least portions of the messages and processing results. The processor 32 may be controlled by the computer program 35. The apparatus 30 may represent e.g. the middle-boxes 15, 16, 17, 18 of FIG. 1, or the devices 21, 22, 23 of FIG. 2 operating as middle-boxes.

Portable and mobile devices, such as laptop computers and mobile phones that access an IP network, or more generally a packet-switched network, through a wireless access network, such as a WLAN (Wireless Local Access Network), or through a mobile communication network, such as a GSM or a UMTS network, including a radio access network, typically operate on battery power at least part of the time, depending on a device user's personal preferences. Battery-powered devices usually run some type of power-saving schemes in order to safe battery energy. A need for sending dummy data packets from a battery operated wireless device in order to keep a data flow active for the purpose of maintaining a state associated with the data flow at a middle-box may involve disadvantages as to the efficiency of the wireless device's power saving functions and of radio resource usage. The embodiments of the invention illustrated herein may alleviate those disadvantages.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

We claim:

1. A method comprising:

receiving in a communications apparatus a message associated with a connection initiation, wherein the message comprises a timer value, wherein the communications apparatus is not an addressee of the message, wherein the message further comprises a compliance indicator determining whether the timer value meets a predetermined criterion according to a policy of the communications apparatus;

responsive to the timer value not meeting the predetermined criterion, modifying the timer value so it meets the predetermined criterion and modifying the compliance indicator; and causing the message comprising the modified timer value and the modified compliance indicator to be forwarded from the communications apparatus toward the addressee of the message.

2. A method according to claim 1, wherein:

the timer value is a state keeping timer value indicating a time period, for which a data flow may be inactive before a state associated with the data flow is removed.

3. A communications apparatus comprising:
a communication interface configured to operate a communication connection;
at least one memory including computer program code
at least one processor functionally coupled to the communication interface, the at least one processor and at least one memory are configured by at least the computer program code to cause the apparatus to perform at least the following:
receive a message associated with a connection initiation through the communication interface wherein the message comprises a timer value, wherein the communications apparatus is not an addressee of the message, wherein the message further comprises a compliance indicator;
determine whether the timer value meets a predetermined criterion according to a policy of the communications apparatus;
responsive to the timer value not meeting the predetermined criterion, modify the timer value so it meets the predetermined criterion and modify the compliance indicator; and
forward, through the communication interface, the message comprising the modified timer value and the modified compliance indicator toward the addressee of the message.

4. An apparatus according to claim 3, wherein the timer value is a state keeping timer value indicating a time period, for which a data flow may be inactive before a state associated with the data flow is removed.

5. A computer program product embodied on a non-transitory computer-readable medium, the computer program comprising program code operable to be loaded into the memory of and executed on a computing apparatus, the program code having been configured to enable, when executed, the computing apparatus to:
receive a message associated with a connection initiation, wherein the message comprises a timer value, wherein the computing apparatus is not an addressee of the message, wherein the message further comprises a compliance indicator;
determine whether the timer value meets a predetermined criterion according to a policy of the communications apparatus;
responsive to the timer value not meeting the predetermined criterion, modify the timer value so it meets the predetermined criterion and modify the compliance indicator; and
cause the message comprising the modified timer value and the modified compliance indicator to be forwarded toward the addressee of the message.

6. A computer program product according to claim 5, wherein:
the timer value is a state keeping timer value indicating a time period, for which a data flow may be inactive before a state associated with the data flow is removed.

7. A method according to claim 1:
wherein the connection initiation is for a connection between an initiating node and a destination node, and wherein the communication apparatus is not the destination node but is an a pathway between the initiating node and the destination node;
wherein the timer value indicates a time period for which a state corresponding to the connection is to be kept active at least at the communications apparatus and any other communications apparatus in a pathway between the communications apparatus and the destination node; and
wherein the method further comprises, responsive to the timer value meeting the predetermined criterion, causing the message with the timer value to be forwarded from the communications apparatus toward the addressee of the message.

8. A method according to claim 7, further comprising, in response to expiration of the time period indicated either by the timer value if the timer value meets the predetermined criterion or by the modified timer value if the timer value does not meet the predetermined criterion, causing at the communications apparatus the state corresponding to the connection to be cleared.

9. A method according to claim 2, further comprising:
setting a timer to the timer value; and
in response to expiration of the time period as indicated by the timer, removing the state associated with the data flow.

10. An apparatus according to claim 3:
wherein the connection initiation is for a connection between an initiating node and a destination node, and wherein the communication apparatus is not the destination node but is in a pathway between the initiating node and the destination node;
wherein the timer value indicates a time period for which a state corresponding to the connection is to be kept active at least at the communications apparatus and any other communications apparatus in a pathway between the communications apparatus and the destination node; and
wherein the at least one processor and at least one memory are further configured by at least the computer program code to cause the apparatus to perform at least the following: responsive to the timer value meeting the predetermined criterion, cause the message with the timer value to be forwarded from the communications apparatus toward the addressee of the message.

11. An apparatus according to claim 10, wherein the at least one processor and at least one memory are further configured by at least the computer program code to cause the apparatus to perform at least the following: in response to expiration of the time period indicated either by the timer value if the timer value meets the predetermined criterion or by the modified timer value if the timer value does not meet the predetermined criterion, cause at the communications apparatus the state corresponding to the connection to be cleared.

12. An apparatus according to claim 4, wherein the at least one processor and at least one memory are further configured by at least the computer program code to cause the apparatus to perform at least the following:
setting a timer to the timer value; and
in response to expiration of the time period as indicated by the timer, removing the state associated with the data flow.

13. A computer program product according to claim 5:
wherein the connection initiation is for a connection between an initiating node and a destination node, and wherein the computing apparatus is not the destination node but is an a pathway between the initiating node and the destination node;
wherein the timer value indicates a time period for which a state corresponding to the connection is to be kept active at least at the computing apparatus and any communications apparatus in a pathway between the computing apparatus and the destination node; and wherein the program code is further configured to enable, when executed, the computing apparatus to further perform: responsive to the timer value meeting the predetermined criterion, cause the message with the timer value to be forwarded from the computing apparatus toward the addressee of the message.

14. A computer program product according to claim 13, wherein the program code is further configured to enable, when executed, the computing apparatus to further perform: in response to expiration of the time period indicated either by the timer value if the timer value meets the predetermined criterion or by the modified timer value if the timer value does not meet the predetermined criterion, cause at the communications apparatus the state corresponding to the connection to be cleared.

15. A computer program product according to claim 6, wherein the program code is further configured to enable, when executed, the computing apparatus to further perform:
- setting a timer to the timer value; and
- in response to expiration of the time period as indicated by the timer, removing the state associated with the data flow.

\* \* \* \* \*